United States Patent
Blaisdell et al.

(10) Patent No.: US 7,853,998 B2
(45) Date of Patent: Dec. 14, 2010

(54) FIREWALL PROPAGATION

(75) Inventors: James Blaisdell, Novato, CA (US); Thien Vuong, Pleasanton, CA (US)

(73) Assignee: Mocana Corporation, San Francisco, CA (US)

( * ) Notice: Subject to any disclaimer, the term of this patent is extended or adjusted under 35 U.S.C. 154(b) by 936 days.

(21) Appl. No.: 11/726,559

(22) Filed: Mar. 22, 2007

(65) Prior Publication Data

US 2008/0235755 A1    Sep. 25, 2008

(51) Int. Cl.
G06F 21/00    (2006.01)

(52) U.S. Cl. ............................ 726/12; 726/13; 726/14; 713/153; 713/188

(58) Field of Classification Search .................. 713/153, 713/188; 726/12, 13, 14
See application file for complete search history.

(56) References Cited

U.S. PATENT DOCUMENTS

2005/0182950 A1*  8/2005  Son et al. .................... 713/189
2006/0101511 A1*  5/2006  Faillenot et al. ............... 726/13
2007/0033273 A1*  2/2007  White et al. ................. 709/223
2007/0101433 A1*  5/2007  Louch et al. .................. 726/25

* cited by examiner

Primary Examiner—Matthew B Smithers
Assistant Examiner—Paul Callahan
(74) Attorney, Agent, or Firm—Beyer Law Group LLP (57) ABSTRACT

Methods and systems for propagating data security policies and rules up a chain of network components, for example, from an end-user device having a firewall, to a network component at the "edge" of the network, from where a policy statement can be transmitted to a service provider are described. A device, such as a computer or mobile phone, has, as part of its firewall software, a policy propagation file, that communicates with pre-existing firewall software. The firewall software creates a policy statement upon detecting a triggering event, which is transmitted from the device to the next data security component up the chain, "upstream," in the network. The firewall server may combine policy statements from numerous end-user type devices and transmit the policy statement to an external network component. The ISP or other service provider may then use the policy statement to implement data security rules for the devices in the network.

9 Claims, 8 Drawing Sheets

POLICY PROPAGATION FILE — 500

| TRIGGER NAME | TRIGGER DEFINITION | TRIGGER POLICY |
|---|---|---|
| < Tname 1 > | < Cond A >and< Cond M > | PERFORM ACTION E |
| < Tname 2 > | < Cond B > ... | PERFORM ACTION L |
| < Tname 3 > | < Cond D >,< Cond N > | PERFORM ACTION ..... |
| < Tname 4 > | or< Cond C >< Cond X > | ⋮ |
| ⋮ | ⋮ | |

TRIGGER DIRECTORY — 602

| TRIGGER NAME | DEFINITION | POLICY |
|---|---|---|
| < Tname 1 > | < LONG-HAND-DESCRIPTION > | < ACTION TO BE TAKEN > |
| < Tname 2 > | ⋮ | ⋮ |
| ⋮ | | |

FIREWALL PROPAGATION

BACKGROUND OF THE INVENTION

1. Field of the Invention

The present invention relates to communication network security. More specifically, it relates to firewall technology and exchange of data between networks.

2. Description of the Related Art

Firewalls have made a significant contribution to computer network security, particularly since the advent of the Internet. As is well known in the field of computer networking, there are numerous types of firewall technology, such as application-layer firewalls, network-layer firewalls, and so on, which can be implemented as hardware, software, firmware, or combinations thereof. However, firewalls and computer network security in general should continue to expand and improve. Attacks on enterprise and home networks are growing increasingly sophisticated. More individuals are using portable, hand-held, IP-enabled devices to communicate. While network bandwidth has increased, so has the number of users. Thus, sharing bandwidth and assigning priorities to bandwidth usage have become important factors to service providers and network operators. As wired and wireless digital communication becomes more prevalent, users are demanding more options with regard to network usage, such as paying premiums for guaranteed service, for a larger share of a digital pipeline, or for ensuring certain levels of network performance. Thus, for the benefit of various entities, ranging, for example, from telecom providers and ISPs to individual VoIP phone users, it would be useful to expand the capabilities of firewalls.

ISPs normally let all or most data traffic into a network, leaving it to the network owner to keep bad traffic out using devices such as firewalls. The ISP has access to the Internet via a high speed network, such as a fiber optic network. The connection from the ISP to a typical enterprise network, via a T1 line, for example, has a much smaller bandwidth and can be easily saturated and cause denial of service and other issues for the network owner. Malicious parties have the ability to consume the network's bandwidth between the network's firewalls and the ISP.

In addition, within a home network (as well as other networks), users may want to ensure that they have outgoing service at all times for certain devices. For example, a VoIP phone may be used to make a 911 call and the user will want to ensure that the call is made. However, if another device in the home network is consuming all the bandwidth (e.g., a DVR downloading a TV schedule or a PC downloading a movie file), the VoIP phone call may not make it through.

Therefore, it would be desirable have a firewall operated by the ISP that implements rules and policies of a network owner or the owner of a stand-alone device, thereby preventing unwanted traffic from entering the network and ensuring that there is available bandwidth for data leaving the network in certain specified circumstances.

SUMMARY OF THE INVENTION

In one aspect of the present invention, a data communication network is described. The network includes at least one device. In one embodiment, the network is an internal network of devices. In another embodiment, there is a single end-user device connected to a service provider's network. In the internal network embodiment, there is a data-filtering server having a trigger component that stores trigger names, trigger definitions, and propagation policies. It may also contain a trigger definition translation module and a trigger directory. The network also includes a data-filtering module having a policy propagation file and second, downstream data filtering module having a second policy propagation file. The network also has a data filtering policy server for combining policy statements. In another embodiment, the network is connected to an ISP network server. In yet another embodiment, the network has a policy statement containing trigger names and propagation policies.

In another aspect of the present invention, a method of filtering data entering a network is described. A policy statement is created on a network device or an end-user device, the statement containing trigger names, propagation policies, and trigger short definitions. Within the network, the policy statement is propagated to a network data security server. It is then determined whether there is a match between a trigger name contained in the policy statement with a second trigger name contained in a second policy statement contained in the network data security server. If there is a match, a combined policy statement is created, wherein the combined policy statement contains data that overrides data in the first policy statement. It is then determined who should receive the combined policy statement. In one embodiment, a network component detects an event or action taking place and determines whether the event is a trigger, which includes checking whether the event is listed in a policy propagation file. In another embodiment, it is determined whether the event is a network-based trigger or an external trigger. In yet another embodiment, a policy statement is created by storing trigger data in the statement when the trigger is activated. In yet another embodiment, the policy statement is created by storing trigger data in a policy statement when a trigger is activated.

These and other features of the present invention will be presented in more detail in the following detailed description of the invention and the associated figures.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Example embodiments of a network utilizing novel firewall and firewall propagating technology according to the present invention are described. These examples and embodiments are provided solely to add context and aid in the understanding of the invention. Thus, it will be apparent to one skilled in the art that the present invention may be practiced without some or all of the specific details described herein. In other instances, well-known concepts and networking components and technologies have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

Methods and networking systems for propagating and expanding the capabilities of one or more firewalls in private or public networks or of a stand-alone device are described in the various figures. A firewall, implemented in the described embodiment as either a software component in a user device (e.g., a PC, a VoIP phone, an IP-enabled PDA, and the like) or as a separate hardware component, implements security and data filtering rules to data entering or leaving a computing device.

In one aspect of the present invention, security rules of individual firewalls operate in response to triggers caused by certain events and conditions thereby creating a policy statement that contains instructions and modified rules. In one embodiment, these rules, encapsulated in the policy statement, are propagated up a chain of firewalls terminating at a firewall implemented by an ISP, or in the case of a stand-alone device, directly to the ISP firewall. This allows a firewall, operating at a more effective and advantageous network location, to implement the security rules of the originating firewall. In another embodiment, a policy statement may be transmitted downstream closer to the end user device. As described below, this allows for more efficient use of network bandwidth and can be effective, for example, in preventing denial of service attacks, ensuring bandwidth availability, enforcing priority of use for devices within a network, and the like. It also allows ISPs to fine tune their services to customers by permitting the propagation of a customer's firewall policy to be implemented at an ISP's firewalls.

Figure 1A:
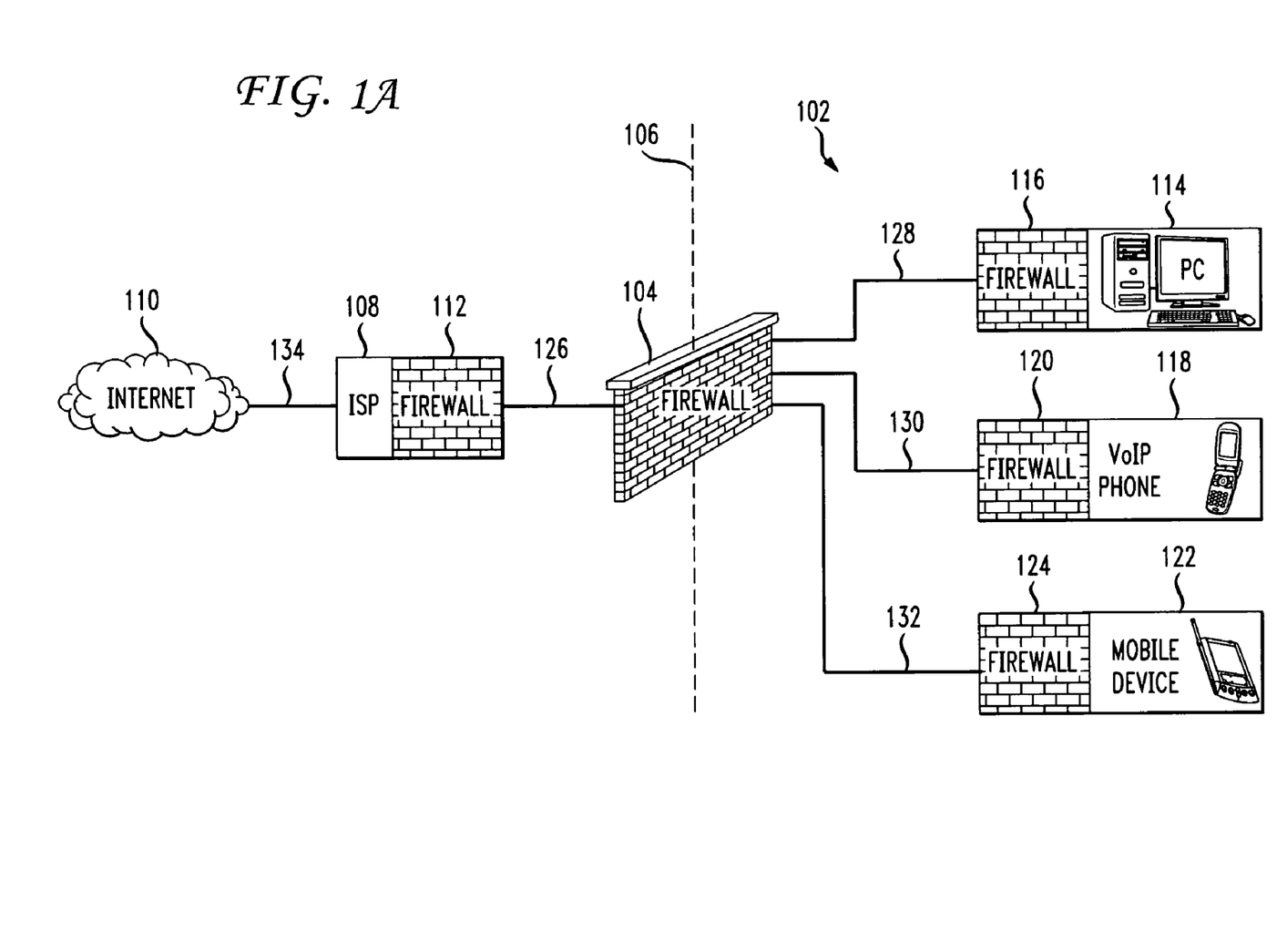
FIG. 1A is a network diagram showing one configuration of firewalls in a communications network in accordance with one embodiment of the present invention.

FIG. 1A is a network diagram showing one configuration of firewalls in a communications network in accordance with one embodiment of the present invention. An entity, such as a company or institution, operating an enterprise network 102 has at least one firewall 104 at the edge or border 106 of network 102. Firewall 104, also referred to as an "edge firewall," filters data entering network 102 and may examine data leaving network 102. As described below, there are many different types of firewalls, such as stateful firewalls, stateful firewalls with application-level filters, stateless firewalls, network layer firewalls, application-proxy firewalls, and so on. However, the present invention is not limited to use with any one specific type of firewall.

In the described embodiment, the external network is the Internet 110 or some other public network. The entity, for example, a company, receives and transmits data using an ISP 108 which provides services to the entity for accessing the Internet. In the described embodiment of the present invention, ISP 108 has a firewall 112. A connection 126 enables ISP 108 to provide and receive data from network 102. Bandwidth of connection 126 can vary but is normally in the range of 0.5 megabits to 155 megabits. The connection 134 between ISP 108 and Internet 110 is often a relatively high bandwidth connection in the range of 1 to 10 gigabits.

In enterprise network 102, firewall 104 is logically connected to numerous user components as well as non-end user or network components. Examples are shown in FIG 1A: a PC 114 having a firewall 116, a VoIP phone 118 with firewall 120, and a mobile, hand-held computing device 122, such as a PDA, having a firewall 124. Each have connections 128, 130 and 132, respectively. The bandwidth of these connections may depend on the type of end-user device. The internal implementation of firewalls 104 (the "edge" firewall), 116, 120, and 124, and the propagation of these firewalls to firewall 112 at the ISP are described below.

Figure 1B:
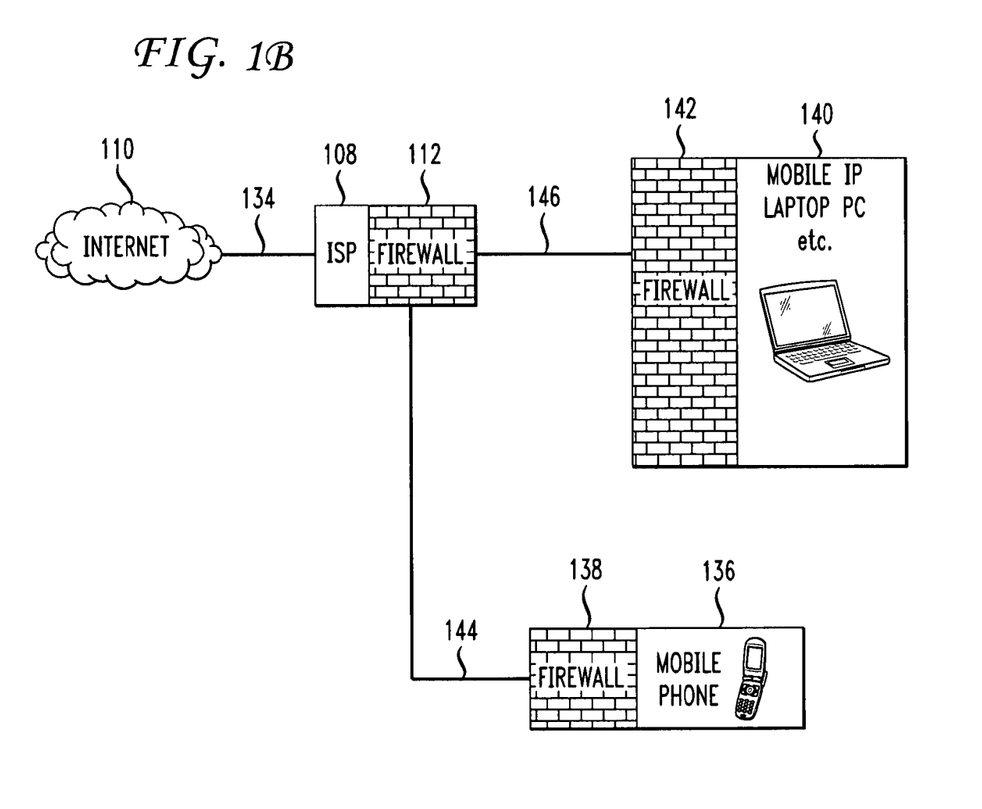
FIG. 1B shows an alternative network configuration and arrangement of firewalls in accordance with one embodiment of the present invention.

FIG. 1B shows an alternative network configuration and arrangement of firewalls in accordance with one embodiment of the present invention. As in FIG. 1A, FIG. 1B shows Internet 110 and ISP 108 having firewall 112 utilizing connection 134. In FIG. 1B, there is no enterprise network but rather individual users operating an IP-enabled mobile phone 136 having a firewall 138 and a portable IP-enabled laptop PC 140 having firewall 142. Mobile phone 136 is connected to ISP 108 via connection 144 and laptop PC 140 is connected via connection 146. These connections, as well as those in FIG. 1A, may be wired or wireless. The internal implementation of firewalls 138 and 142, and the propagation of the security rules and other data in these firewalls and firewalls 116, 120, and 124 of FIG. 1A and utilization of ISP firewall 112 are described in further detail below.

FIGS. 1A and 1B show that various embodiments of the present invention may be implemented in internal, private networks having an edge firewall 104 and with stand-alone, end-user devices and components that have internal firewalls that are not connected in a private network but, instead, communicate directly with ISP 108. FIGS. 1A and 1B are purely illustrative of some embodiments of the present invention. The present invention may be used in numerous other network topologies and configurations known to those skilled in the art. However, for the purpose of illustrating one embodiment of the present invention, the private enterprise network configuration shown in FIG. 1A is used to further describe the present invention.

Figure 2:
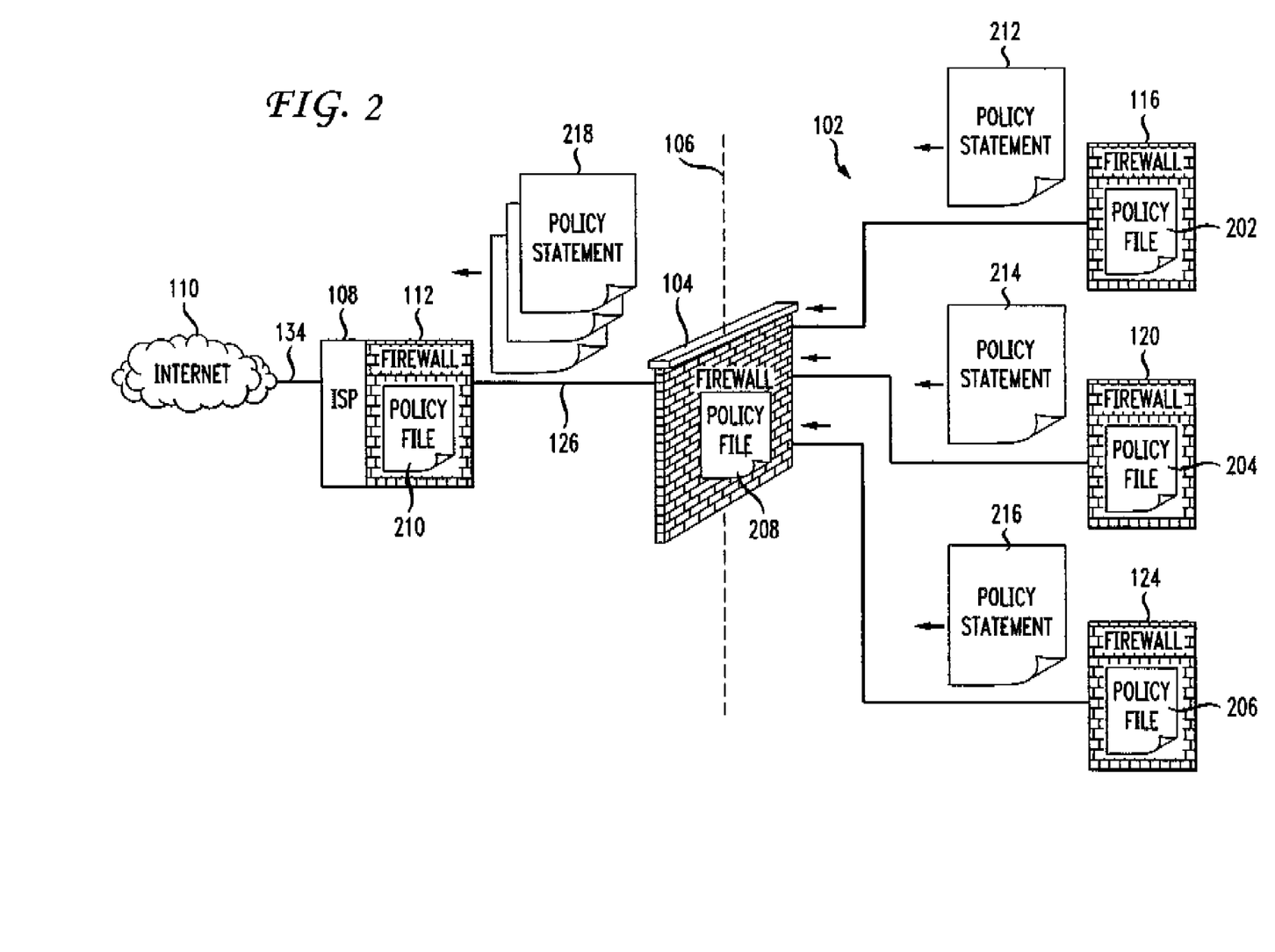
FIG. 2 is a detailed diagram of components shown in the network configuration of FIG. 1A in accordance with one embodiment of the present invention.

FIG. 2 is a detailed diagram of components shown in the network configuration of FIG. 1A in accordance with one embodiment of the present invention. Some of the components in FIG. 2 have already been described, such as, Internet 110, connection 134, ISP 108 and associated firewall 112, connection 126, firewall 104, the end-user devices and their respective firewalls. Shown in FIG. 2 are policy propagation files in each of the end-user firewalls and arrows showing the described embodiment of an upstream propagation of resulting policy instructions to ISP firewall 112.

Firewall 116 (for PC 114 not shown in FIG. 2) has a policy propagation file 202 ("policy file"). Firewall 120 has policy file 204 and firewall 124 has policy file 206. These policy propagation files can be incorporated into firewall software or a firmware/hardware device. In another embodiment, they can be enhancements to the existing firewalls. Firewall 104 also has a policy propagation file 208 and firewall 112 at ISP 108 also has a policy propagation file 210. There may be numerous other components in network 102 that have firewalls which are not shown in FIG. 2 for clarity and to clearly illustrate the functionality of the present invention. As described below, a generic firewall program of the present invention has two components: a pre-existing firmware/software component and a trigger component that instructs on how to propagate triggers in the network. The trigger component is, in one embodiment, entirely contained within a firewall software program or hardware device, and is location independent within the network.

In one embodiment, firewall policy statements are propagated from, for example, firewalls 116, 120, and 124 to ISP firewall 112. Shown in FIG. 2 are example policy statements files originating at the various firewalls. Policy statement 212 is propagated from firewall 116 to firewall 104. In another embodiment, policy statement 212 and other policy statements may go to a policy server where they are combined before being further propagated upstream in the network. Policy statement 214 is transmitted from firewall 120 to firewall 104, as is policy statement 216 from firewall 124. As described in further detail below, one or more policy statements 218 are propagated from network edge firewall 104, where it exits enterprise network 102, crossing boundary 106, and are transmitted to ISP firewall 112. In another embodiment, the policy statements may be transmitted downstream to the end user devices in the network.

Figure 3:
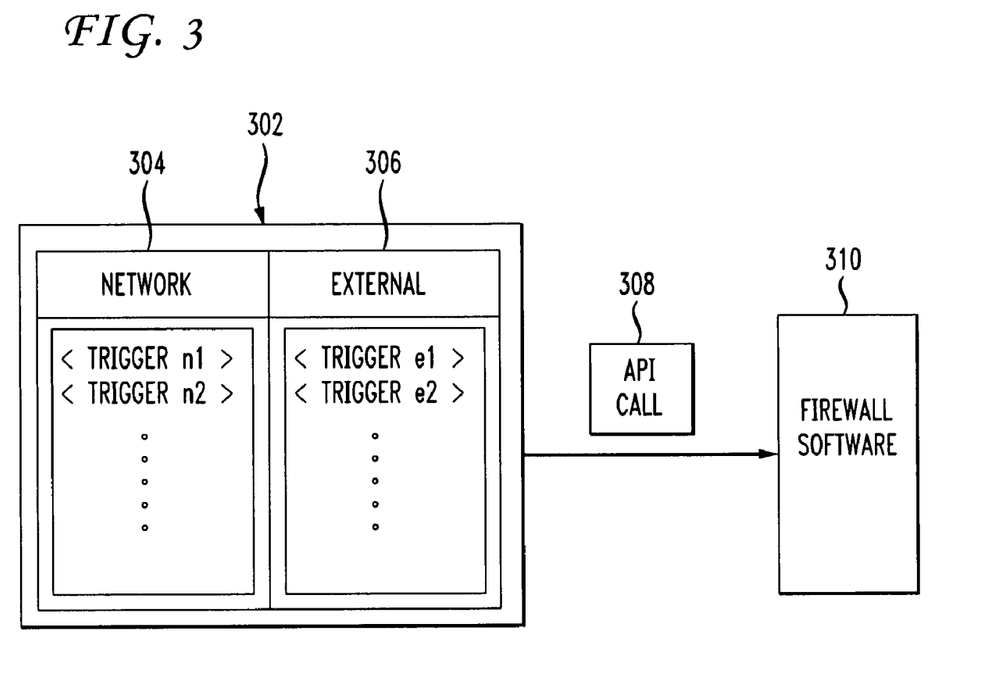
FIG. 3 shows a format of a policy propagation file and its relationship with pre-existing, firewall software in accordance with one embodiment of the present invention.

FIG. 3 shows a format of a policy propagation file and its relationship with pre-existing, firewall software in accordance with one embodiment of the present invention. A file 302, (such as policy files 202, 204, and 206) implemented in one of the firewalls (e.g., 116, 120, 124, 104, etc.), contains a list of triggers, among other data. In one embodiment, some triggers may be classified as network triggers 304, shown as trigger n1, trigger n2, and so on, and are based on network events. External triggers 306, shown as trigger e1, e2, and so on, are based on non-network or "real world" events. There may be other types of triggers such as internal firewall triggers, software rule triggers, timer triggers (e.g., time of day, day of week, etc.), and so on. Examples include voice call initiation/termination, media traffic initiation/termination, and so on. As described below, if one or more events occur that invoke one of the triggers, an API call 308 is made to firewall software 310 and instructions to re-configure the software are provided. In one embodiment, firewall software 310 may then propagate a policy statement to the next firewall in a default gateway chain in enterprise network 102. For example, firewall 104 may receive policy statements 212, 214, and 216, and use its own policy propagation file 208 to form a policy statement 218.

Figure 4:
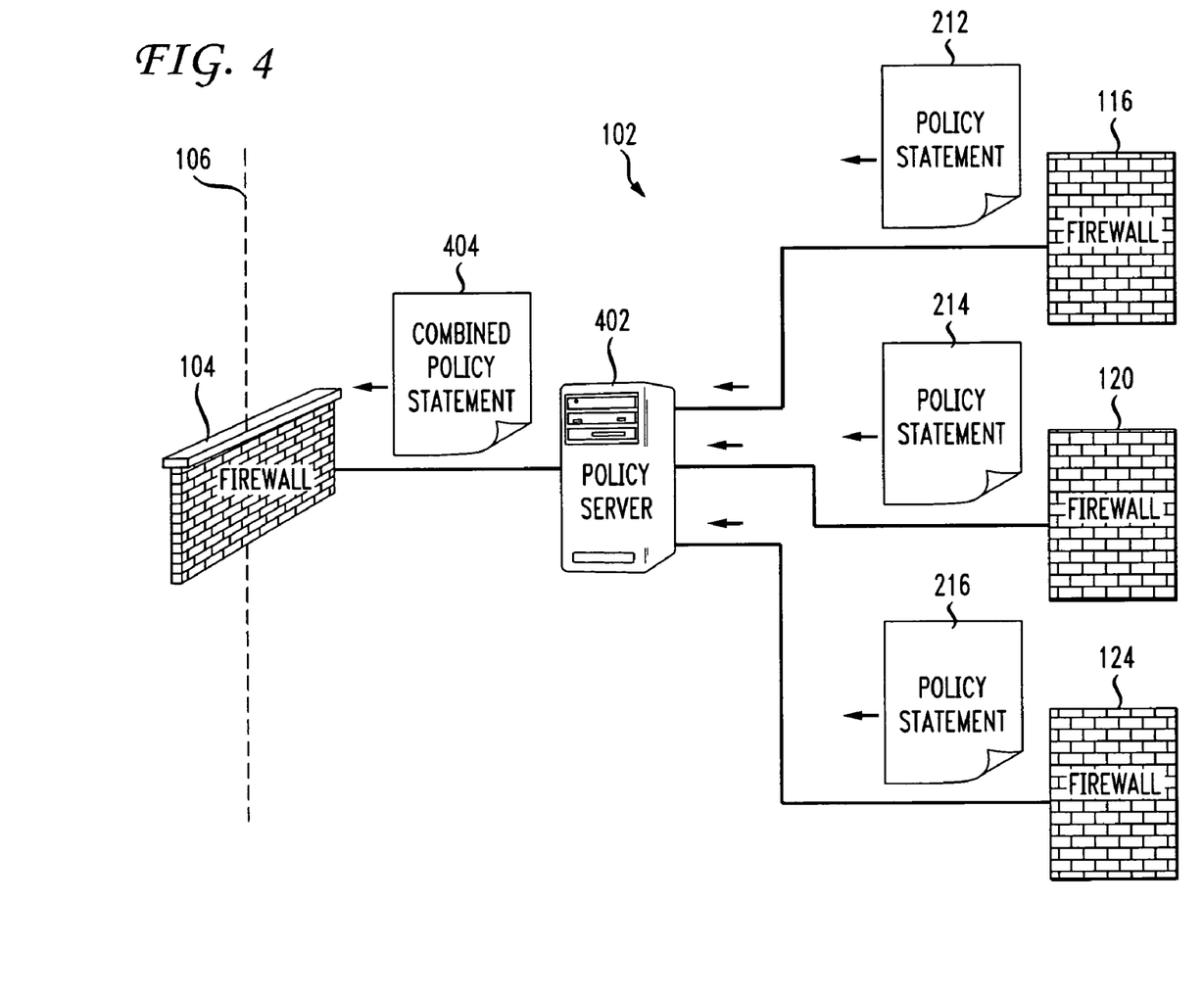
FIG. 4 is a network diagram showing an alternative internal network configuration utilizing a firewall policy server.

FIG. 4 is a network diagram showing an alternative internal network configuration utilizing a firewall policy server. A firewall policy server 402 receives policy statements 212, 214, and 216 from firewalls 116, 120, and 124, respectively (policy propagation files not shown). Policy server 402 combines or integrates the data, such as instructions, rules, etc. contained in these statements to create a combined firewall policy statement 404 which is propagated to firewall 104. In other embodiments, there may be numerous policy servers 402 within a network 102, each receiving policy statements from firewalls of components and devices in its domain and transmitting them to firewall 104. Similarly, there may be numerous edge firewalls 104 at border 106 of network 102. For example, there may be a network firewall 104 at every connection between network 102 and ISP 108.

Figure 5:
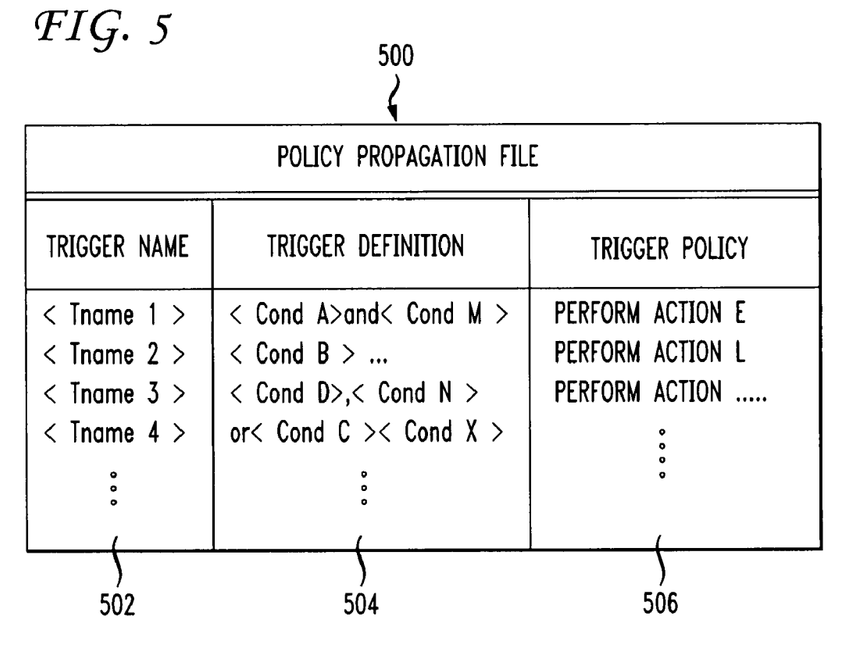
FIG. 5 is a block diagram of a policy propagation file stored on a network components firewall in accordance with one embodiment of the present invention.

FIG. 5 is a block diagram of a policy propagation file stored on a network components firewall in accordance with one embodiment of the present invention. It shows in greater detail file 302 of FIG. 3. In one embodiment, a policy propagation file 500 shows a list of trigger names 502, a list of trigger definitions 504, and a list of trigger policies 506. In other embodiments there may be more or fewer categories of data than shown in FIG. 5. As noted above, in one embodiment, triggers may be classified as network-related triggers external triggers, internal firewall triggers, and so on. Various other classifications may be implemented.

In one embodiment, a trigger name is used as a unique identifier for a specific trigger definition. In some embodiments, the trigger name may contain some indicia of the type of trigger, of the conditions making up the trigger, or it may simply be an arbitrary name assigned by a network administrator. Trigger definition 504 is made up of one or more conditions or events that must occur for a trigger to be activated. For example, an event may be "phone receiver pick up" or "number of TCP/IP resets has exceeded 25" or "bad network traffic has exceeded a threshold value" and so on. The type and variety of conditions and events can vary widely and will likely depend on the type of equipment being used. For example, the triggers in a policy propagation file stored in firewall 116 for PC 114 may be different from triggers in firewall 120 for VoIP phone 118. In one embodiment, there may be a process to translate a trigger definition, for example, by implementing a policy trigger translation module in the firewall software or as part of policy propagation file 500 itself. There may also be many trigger definitions that are common to most network devices, such as for components that are network driven. External triggers, for example, that may be caused by user-initiated events, are likely to be more component specific. Conditions and events can be set by one or more parties, such as the equipment manufacturer (for cell phones, PDAs, etc.), network administrators (for PCs, servers, etc.), or by component users. In another embodiment, a policy statement or individual trigger definition may be sent prior to a trigger event occurring, for example to edge firewall 104. This would enable the trigger policy (described below) to be performed in cases where a communication link or channel is not available or when a network wants to ensure high priority to propagation of specific policies.

If a condition or set of conditions is met, the action taken or performed is described in propagation policy category 506. For example, if a VoIP phone receiver is "picked up" because a user wants to make a call (the trigger), the actions taken may be "stop all ads from being delivered to that phone" and "focus all resources on enabling user to make a call" and the like. In another example, if the trigger is "the number of TCP/IP resets has exceeded 25," the actions described in propagation policy category 506 may be "disable device" and "re-enable if bad traffic has decreased." The conditional language and syntax used for implementing the trigger definitions and the propagation policies may vary and may use known conditional programming language concepts and formats. Defining triggers, storing them in policy propagation file 500, and implementing them in firewall software for an end user device may require some degree of technical sophistication. Therefore, in other embodiments, there may be a template or software tool that allows users of consumer equipment, such as VoIP phones, PDAs, and home networks, to create policy propagation files and store them on a network or stand-alone devices. This would allow non-enterprise network users, such as users of home networks, to program their firewalls as they wish to meet their changing needs. In another embodiment, policy propagation file 500 may be structured more generically to show, for example, conditions necessary to disable, enable, or propagate firewall rules, rather than triggering specific policies or acts. In another example, the trigger policy is not propagated upstream in the network.

Figure 6:
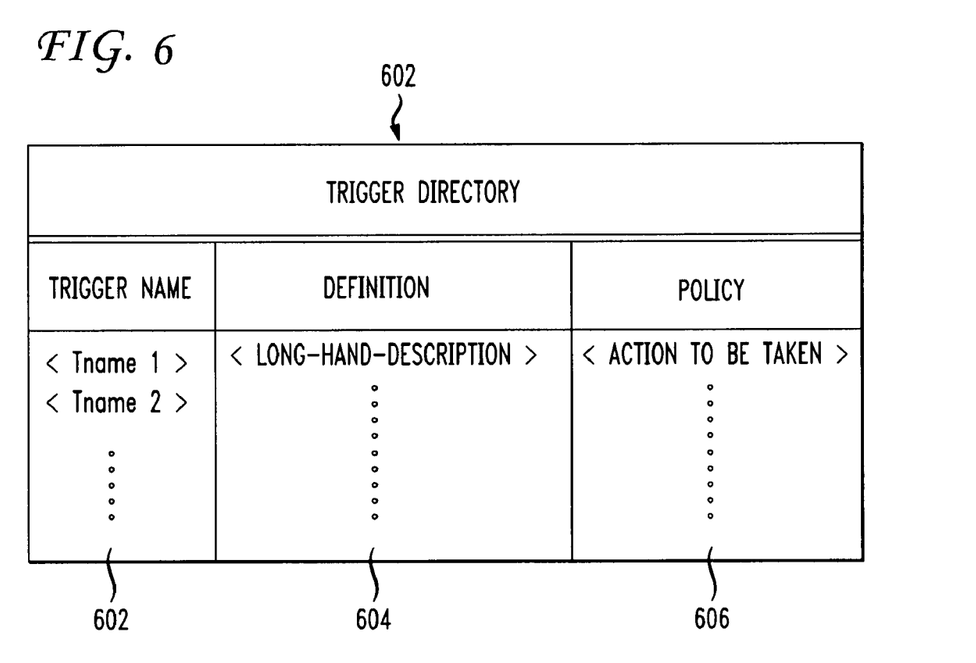
FIG. 6 is a block diagram of a trigger directory 602 showing all or some trigger names, definitions, and associated policies in a network.

FIG. 6 is a block diagram of a trigger directory 602 showing all or some trigger names, definitions, and associated policies in a network. In an enterprise network environment, directory 602 may be stored on any appropriate network component, preferably at a location accessible to a network administrator and not to general users of the network. In other environments, such as a home network, directory 602 may be accessible to all users of the home network. For stand-alone devices where only one firewall is used, directory 602 may be identical to policy propagation file 500 on the device, such as a PDA or IP-enabled mobile phone. In another embodiment, policy propagation file 500 may be a subset of directory 602 such that the user may be able to select triggers from directory 602 to be applied in the policy propagation for the device. In the described embodiment, the categories of data in trigger directory 602 are similar to those in policy propagation file 500 and may have similar formats. In the described embodiment, there is a trigger name 602, long-hand description of trigger definition 604, and propagation policy 606. In other embodiments, the format of trigger directory 602 may include additional information about the trigger definitions, what actions to perform, and so on. For example, there may be an area for a short description of a trigger. In the described embodiment, trigger directory 602 may also be used to add new triggers. A user or network administrator may assign a trigger name (or one may be automatically assigned by the firewall) and formulate the definition using the conditional logic and language used in the firewall.

Figure 7:
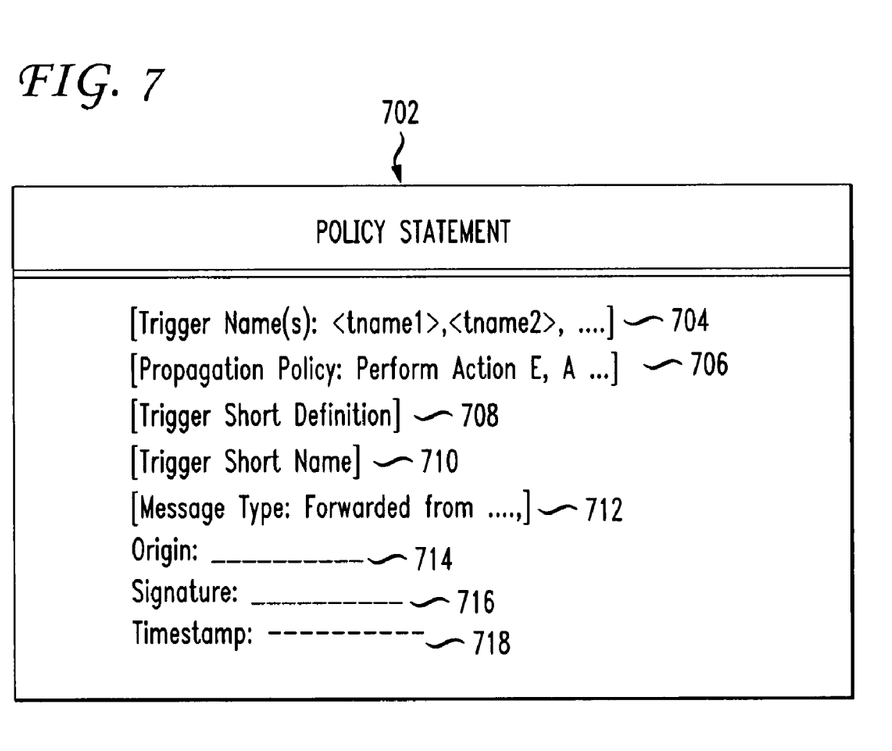
FIG. 7 is a block diagram of a policy statement in accordance with one embodiment of the present invention.

FIG. 7 is a block diagram of a policy statement in accordance with one embodiment of the present invention. It shows in greater detail files 212, 214, and 216 of FIG. 2. Shown in FIG. 7 is a policy statement 702 containing trigger name or names 704, propagation policy 706, trigger short definitions 708, and trigger short name 710. In other embodiments, policy statement 702 may also contain more or fewer items than those shown in FIG. 7. For example, it may also have a trigger long description or definition.

In the described embodiment, policy statement 702 is created at the firewall, such as firewall 116, 120 or 124. When a trigger is activated, that is, when the conditions defining the trigger are met, data on the trigger are stored in policy statement 702. The specific data items stored may vary and depend on what information is needed at the source. As noted above, in one embodiment, these data may be the trigger name 704 and the propagation policy 706. The type of data included in policy statement 702 may also depend on the component receiving the statement. For example, a short name (or code name) may only be needed instead of transmitting all or some of the data items shown in FIG. 7. The source, such as edge firewall 104 or policy server 402, may only need a trigger name or code to know which policy to execute. In other embodiments, it may be desirable to transmit more data. For example, if a policy server, such as server 402 in FIG. 4, receives the statement, it may only need the trigger name because it has data on all the policy propagation files for components it is responsible for or connected to. In another embodiment, if the receiving component has trigger directory 602 for all the triggers in the network or in a particular domain of the network from where it receives policy documents, statement 702 may only need a trigger name. In other embodiments, a full description of the trigger, as well as propagation policies 706, may be needed. In one embodiment, policy statement 702 may also include message type data 712 on the component from which the policy document was forwarded and origin data 714 providing information on the original source of policy statement 702, such as end user network components, PC 114 or VoIP phone 118. In the described embodiment, policy statement 702 has a digital signature 716 made by the originating firewall or device. A variety of known methods for implementing a digital signature or other security measures can be used to verify and authenticate that the policy document is being propagated by the device indicated in field 714. Also included in policy statement 702 is a timestamp field 718 that may be used in determining the lifetime of the policy statement. This may be useful in cases where the device is disabled or goes down because of an unexpected event.

Figure 8:
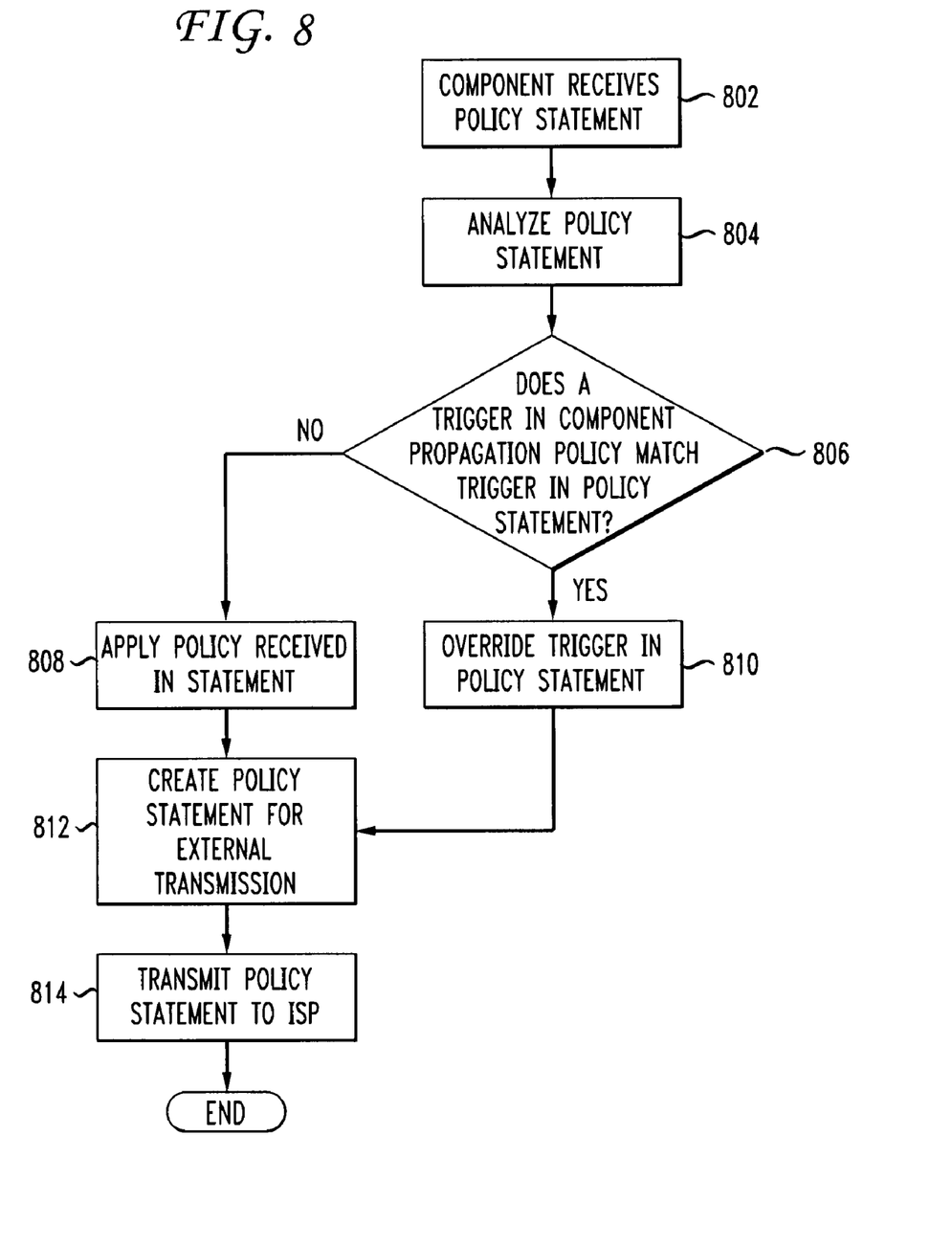
FIG. 8 is a flow chart of a method for determining the upward propagation of policies and rules received from firewalls down the domain chain in a network in accordance with one embodiment of the present invention.

FIG. 8 is a flow chart of a method for determining the upward propagation of policies and rules received from firewalls up the domain chain in a network in accordance with one embodiment of the present invention. For example, the process described in FIG. 8 may be performed on network edge firewall 104 or other network firewall capable of communicating with external ISP firewall 112.

At step 802 the network firewall receives a policy statement from a firewall downstream in network 102. In another embodiment the network firewall 104 may receive a policy statement from a policy server as described in FIG. 4. At step 804 the network firewall examines the policy statement to determine whether a trigger name 704, propagation policy 706, etc. is included or covered in the network firewall's policy propagation file, as described in FIG. 5. At step 806 a comparison is made between the firewall's policy propagation file and the policy statement that was received. If there is no match between a trigger short name, propagation policy, and the like, contained in the policy statement, control goes to step 808. At step 808, the network firewall applies the propagation policy embodied in the policy document.

If there is a match at step 806, network firewall 104 applies the propagation policy contained in its policy propagation file 208 thereby overriding the policy provided by the downstream network device or policy server. At step 812 network firewall 104 creates one or more policy statements that are transmitted outside of network 102. In the described embodiment, external policy statements 218 are transmitted to ISP firewall 112 at step 814. In the case where there are multiple ISPs or other recipients, firewall 104 determines which policy statements are transmitted to which recipients, ISPs, and the like. At this stage the processes within network 102 are complete.

When ISP firewall 112 receives policy statement 218, which may have a format derived in collaboration with ISP 108, it may apply its own policy propagation file 210. At ISP 108, the ISP may implement its own proprietary process of propagating policy statements that it receives from network 102 and other networks. Based on the instructions and policies contained in policy statement 218, ISP 108 may, for example, compute costs and fees associated with implementing the specific instructions for network 102 (i.e., the ISP's customer) and perform billing and accounting functions. ISP 108 may also delete duplicate policy statements or duplicate content among multiple statements, and perform other optimizations.

2. Use Cases 2.1. Preserving Bandwidth for Premium/Critical Service

When certain user event are triggered (i.e. making/receiving IP phone call, start downloading on-demand video), firewall would be enabled and propagated to block out lower priority traffic. An alternative solution is to provide prioritized queue to preserve the bandwidth of the premium service (by priority bit coloring). This policy could also be propagated upstream to enable early classification.

2.2. General Prevention of DOS/Network Attack

Upon a general detection of network attach, via the local firewall, or under command of some sentry nodes, strong firewall protection policy would be enabled to protect the critical local service until the attack could be better analyzed, better firewall rule deployed to restore normal service.

2.3. Deploying Firewall Closer to Better Defensive Position

Firewall should be moved to network location with larger incoming bandwidth to prevent DOS attack which clog the data pipe.

- Device periodically discovers upstream peer for firewall location (could be statically provisioned)
- When a firewall profile is modified (add/delete), local agent selects the best peer(s) firewall to send the rule to. The local agent owns the profile and maintains the mapping of the profile vs the active node running the rule (one or more)
- The profile will be moved/activated/deactivated as a group.
- Remote agent could deny the rule update for various reasons. In which case, the profile will be maintained locally.
- Because of the network topology, the profile may have to be moved to multiple nodes (i.e. in case there are multiple matching route to the local router). In that case, the propagation is considered successful only if all destinations accept the profile
- If the firewall owner goes down. It's remote profile would be removed automatically after an predetermined interval.
- In disable firewall, the owner must attempt to request disabling until successful or until the remote device notify that the profile is not present.

2.4. Deploying Firewall Closer to Source of Attack

Firewall should be moved to network location closer to the source of attack (based on routing information) to minimize adverse effect of attack to network.

Traditionally, firewall has been located closest to the source of protection for the purpose of keeping the number of packets to be inspected low, and as a side effect, creating less damages to data in case of false identification.

This approach does not work well for all cases, especially when the attacking sources are rampants. And a defensive posture, while protecting the local resource from damages, may not be the most effective to protect end-to-end service.

A more proactive firewall allows the system under protection to detecting and identifying the attack, deploying the shields (firewall), moving/replicating the shields to the most effective place (during which time also monitoring the resulting the changing state). In a sense, this would attack the source of the attack and inoculate the overall system against its effect.

2.5. Central Management of Firewalls on Network Edge

Allow network provider to push common firewall policies toward edge device to protect network . . .

2.6. Dynamic Enabling/Disabling of Firewall Rule Based on Usage Events

- Firewall rule are grouped into profiles
- Profiles are activated or deactivated by: software trigger, timer trigger, internal firewall rule trigger.
  - Profile activated based on software generated events: voice call initiation/termination, media traffic initiation/termination.
  - Profile activated based on time of day, day of week,
  - Profile activated based on detection of outgoing traffic (i.e start of call/game)

3. Definitions/Concepts

- Firewall Rule: A self contained, location independent, packet matching rule. A match or non-match will trigger a rule specific action.
- Firewall Profile: A set of firewall rules to be evaluated as a sequence, enabled, or disabled as a set.
- Firewall Program: An intelligent profile which support better programming of firewall rather than a straight sequence (including jump to, subroutine, execution context, variables, session context access, . . . )
- Movable firewall: A firewall which could be applied anywhere on the network with the same terminating behavior. It may needs to be supported with network translation context when traverse across network address boundaries (NAT, VPN)
- Moving direction: A ruleset could be moved upstream (from edge device to network), or downstream (from network to edge device)
- Authorized client. An authorized client which could export its firewall ruleset.
- TLS—Transport Layer Security (RFC 4346). This is used to establish secure domain and transportation of firewall management packets between node.
- DTLS—Datagram TLS (RFC 4347). This could be used for firewall management packets to better address the asynchronous notification and performance issue.nat standnat
- NAT: Network Address Translation (RFC3022). The translation of network address information from one address domain to another. This is done to allow node in a private network to communicate with node on the public network (or on another private network). This is not a strict firewall function, but since it is an integrated part of more home-gateway firewall implementation, it must be provided in Mocana firewall. Since this application attempts to move firewall across these boundaries, and as firewalls are built upon recognition of ip traffic (which include address information)—special handling must be done to allow for the translation as well as the dynamic remap within each address domain.
- SIP—Session Initiation Protocol (RFC3261). Used for VOIP, and multimedia distribution and conference.

4. Requirements

Firewall:
- Cover the functionality of router firewall—strictly traffic based analysis.
- No application or application session based classification.
- Packet inspection firewall (stateless)
- Connection based firewall (stateful)
- Integrated NAT (or intrinsic module). NAT to cover TCP, UDP, and ICMP
- NAT support for FTP (PORT or PASV command?), SIP, and H.232
- Deep packet inspection support (configurable based on local resource availability)
- Dynamically provisioned (API/authentication framework to allow external injection of rules and activation/deactivate of rule)
- Allow simple add on of application level firewall (i.e. application context filtering). This is more of an engineering requirements.

Propagation:
- SSL/TLS to establish trusted administrative domain. Trusted domain defines by a root level certificate.

Must allow server to deactivate the profile.
Must support 3rd party NAT hops in propagation.
Automatic peer discovery.
Protocol should be protected under adverse traffic condition.
Protocol should have mechanism to protect against fake installation of firewall.

Reliability
All actions must be confirmed.
Must allow clients to audit its profile.
Heartbeat to be used to detect peer status.
Rules and profiles must be persistent (i.e. node reboot does not reset rules)
Protection against unauthorized/fake installation of firewall
Monitoring of firewall owner and disable rule if owner goes out of service (to prevent black hole in the network due to zombies)

Performance
Firewall rule performance—Overhead per rule, performance pattern for large number of rules.
Firewall program performance.
Propagation performance. Based on bandwidth and minimum reserved bandwidth. bulk transfer, bulk confirmations.

5. Dependencies

Implementation of this product has the following dependencies:
IP stack, which provide hooks into packet receiving/sending interface.
IP stack implementation of NAPT.
SSL stack (server and client).
XML parsing library.

6. Functional Components

From this section forward, the discussion belongs to the design specifications.

6.1. Propagation Policies 6.1.1. General
A policy file defines the firewall rule to be applied. The policy is to be transferred, enabled, disabled, executed as a single entity.
A terminating device could have one or more policies files deployed.
The policy files could be activate/deactivated by local application (via library trigger points). When to activate/deactivate the policies is totally under the control of the local device and hidden to the network.
A policy is identified uniquely in the network by the device identifier (name+certificate), and the policy name. All destination devices will keep track of the policy owner and will only act on those policies if the owner authentication matches.
A policy file could be accepted and propagate to another server (after local processing) according to the local propagation policy. This fact will be transparent to the original policy file owner. The propagation path per policy file will be remembered so subsequent changes on those policies will be propagated along the same path.
Policies is only propagated to device within the same secured administrative domain (defined by the same set of root certificates negotiated through TLS or DTLS).
A device could propagate policies to more than one servers (policy replication).
Even after propagation, a device could choose to run the policy locally as a backup protection.
Loop detection logic will be built-in to prevent propagation path looping for mis-configured network.
Policies statements will contain lifetime information so the policy could be removed automatically should the policy owner failed to refresh it.
A node could only request propagation for policies controlling its own resources (i.e. source or destination address belonged to it)

6.1.2. Propagation Messages
There are 3 sets of information propagation for firewalls.
1. Firewall rule (or policy file) create or update. These are propagated as soon as they are created or modified to pre-provisioned them at sentry points.
CREATE/UPDATE: (node, file, list of rules, initial state, lifetime)
CONFIRM: (source node, destination node, file)
DENY: (source node, destination, node, file, cause)
2. Policy statements (state update to firewall rule). These are sent when policy status is to be changed (i.e. a trigger force a policy to be active). These following actions are considered:
ENABLE: (node, file, lifetime)
DISABLE: (node, file)
AUDIT: (node, file, digest, file, digest)
DELETE: (node, file)
HEARTBEAT: (node)
STATISTIC Query:
3. Address modifiers to firewall rule. These are sent when terminating device detects changes in internal/external address mapping (NAT) of the data stream. It is used by the terminating device to adjust its firewall rule for the differences in internal/externally visible address.
MAP: (node, protocol, source address, source port, dest address, dest port, lifetime)
UNMAP: (node, protocol, source address, source port)

Hop counts, and source route trace information will be included in all messages to detect propagation loop and to send asynchronous rejections.
Messages may be concatenated and send en-block for efficiency.

6.1.3. Propagation Decision
The server device may be designated as propagating device or as terminating device, or both.
Each candidate device to propagate the policy to is provisioned with a matching profile (address range, port range, protocol). Receiving policies which match this profile will be propagated out to that device.
It is possible to propagate to more than 1 device.
It is possible to propagate to 0 device. In which case, the policy is handled locally (if the local device is designated as such), or would be rejected back to the source.
Profile may still be rejected back to the source due to other reasons (i.e. lack of local resources)
Rejection will be propagated back all the way to the source or to the first node which could handle the policy locally.
Each server in the propagation path must remember its propagation ports for N,P)
Policy will only be accepted for the device owning that resource (i.e. routing address going to it).

6.1.4. Local Policy Handling (and Summarization)
The server must track each profile and its owner, and act upon it based on the request of the authenticated owner.
Summarization of policies: This topic is for further study—although the many algorithms (routing) are know, they are more suitable for a more static network as it is CPU intensive. For dynamic firewall application where filter could be enabled/disabled quickly, the cost may outweight the benefit.

Application hooks should be supported so the server could implement some rule assisted summarization if desired (i.e. a matching policy would trigger an installation of an alternative policy locally).

Policy could be moved from egress to ingress filter by application of routing lookup in the reverse direction.

6.2. Process Flow—Client

6.2.1. Configuration

Configure trusted root level certificate
[Optionally] Configure list of peer for connection to for propagation
[Optionally] Enabling support for peer discovery
Configure firewall profiles
Configure activation rule for firewall

6.2.2. Initialization

Establish connection to all known peers for updating rule. The peer list could be changed during runtime.
Once there is a server connection found, the propagater is activated.
The local client decides which profile is could be transferred to the server side (by routing rule), and sends them to the server.
Profiles sent to server are automatically expired unless refreshed by the client.
During normal operation, if a local profile is activated, it's status will be sent also to the server for activation of the rule.
The local machine may also activate the rule as a back-end protection in case the server side activation failed for some reason. It is expected that the local rule will not be matched except for transient conditions (activation and deactivation time)

6.2.3. Runtime

When profile files are added/deleted/updated
   Install on local host (if applicable)
   Reset existing peer entries to UPDATING. Sending updating to peer.
   When confirmation come back in, mark entry status as ON_PEER.
   When rejection come back, mark entry status as REJECTED. Once rejected, update will not be retried until the next time the profile got updated.
   Confirmation/reject is asynchronous. The command will be retried up to 3 times upon time out. After that, peer status will be marked down.
   If peer status goes down, mark entry status as TO_BE_UPDATED.
   If all peers have accepted profile, it will be disabled on local host.
When peer are added (or went down and back up)
   Go through list of existing profiles, and send update for any candidate profile for that peer. Go through the same sequence as profile modification.
When event trigger change in profile status.
   Go through the list of peer entries, send state update to the one with status ON_PEER.
   Maintain audit information of which profile/state is on which peer.
Auditing
   Periodically, send refresh of profile status to peers.
   Periodically, send list of profile/state digest to peer to audit data correctness.

6.3. Process Flow—Server

6.3.1. Configuration

Configure trusted root level certificate
Configure role of server (propagation, termination, or both)
Configure list of propagating servers.

6.3.2. Initialization

Activating list of pre-existing profile (locally)
Establishing secured control channel to all propagating server.

6.3.3. Runtime

Accepting secured connections from other routers.
When profiles are received from client
   Verify client authorization for installing of the profile.
   Decide whether to install locally or to propagate further
   Follow propagation process similar to client side if needed.
When activation is received from client
   Follow the same path of activate as profile.
When audit is received from client.

6.4. Firewall Engine

Fast packet classification engine.
Support for deep packet inspection.
Execution engine for running of firewall programs.
Definition of firewall program

6.4.1. Firewall Rule (Packet Match)

A firewall rule has 2 parts: a packet matching part and a disposition part.

Packet matching is based on a simple data matching pattern: anchor offset, offset, size, mask (optional), compare/compare-low, compare-high (optional), in list, . . .
   Anchor offset: offset of start match (for different encapsulation support)
   Offset, Size: offset and size of matching data
   Mask (optional): to extract out certain field for use only
   Compare/Compare-low: Value to compare against
   Compare-high: Value to compare against (high)
   Lists (to check if a value is in a set or not)
   This is the base instruction. It is possible also, to create more complex instruction later which could match multiple hard-coded fields for optimization.

The disposition part tells the engine what to do if the packet match:
   Accept/Dropped
   Jump to another step in the rule sequence
   Log the packet
   Turn it over to another external handler (providing filter id).

6.4.2. Firewall Rule (Pattern Match)

This optional module is for matching of higher level application data (mostly string based—i.e. XML, HTML, FTP, . . . ). This should support
   Fixed pattern matching
   Regular expression pattern matching. The capability of regexp will be limited to allow for deterministic real-time processing.

6.4.3. Firewall Profile (Procedure)

The profile is a list of firewall rules and some additional rules which affects the filter flow and engine (it is similar to an assembly or micro-code instruction). The firewall engine just execute the sequence starting from the 1st instruction. Some standard components of an execution engine will be implemented to support general processing.

Sequence counter (program counter)

Execution stack (support implementation of subroutine)

Filter context (to support session based filtering technique—i.e. traffic limiting/shaping)

The rules are executed until a terminal condition is reached: ACCEPT, REJECT, DROPPED. If the sequence terminated w/o a terminating condition, the packets will be treated with a user configured default rule.

A small parser should be provided to translate high level filter definition to the assembly level sequence. It will support Evaluation of complex expression If/then/else Function (optional)

Field name (alias to the field position)

6.4.4. Packet Filter Processing

Each profile is identified with a unique name, and a profile priority number.

The profile will be attached to

Incoming path of an interface (or all interfaces)

Outgoing path of an interface (or all interfaces)

Forwarding path

The profile could be activated or deactivated. When activated, it will be put into the filter list according to its priority number.

When deactivated, it will be removed out of the list.

Packet filtering would simply traverse these lists and apply the user specified rules.

6.4.5. Trigger Supports

Trigger supports allows rules/Sequence to be added/removed/enabled/disabled during runtime. Other applications on the platform should be able to call the provided API (from the application space) and change the rule.

The following support (API's) must be provided

Compilation of new/updated profile into bytecode.

Create of new profile (inactive) into the firewall engine.

Update of existing profile (inactive) from the firewall engine.

Binding of profile to different interface/processing paths.

Activate a firewall profile.

Deactivate a firewall profile.

The last 2 operations must be done very quickly to support dynamic application of firewall based on real-time triggering events.

Each profile is identified with a unique name, and a profile priority number, and the point of attachment A profile could be marked active/inactive Support for enabling/disabling of single rule/sequence is simple. The status could be simply marked, and the ip/firewall process will start/skip processing on the next packet. This works for single table change.

For related table changes, or modification of active tables itself, the ip/firewall processing must be stopped during the time to avoid execution in staled table. To improve performance, one of the technique could be to implement active/standby table to allow updating directly to standby, and instruct ip/firewall to switch working table, so there are no impact for processing. This has the added benefit of being able to rollback if there are any problem applying the change.

6.4.6. Statefull Firewall Support

In stateful firewall, TCP incoming packet could be matched with existing TCP session state and use the matching rule of the TCP session rather than the packet based rule.

Support is added via a new instruction in the filter rule. The same structure could be used, except the comparison value would be TCP state, and the lookup would be based external table (TCP sessions)

6.4.7. Deny of Service (DOS) Detection

DOS detection could be implemented by supporting filter context (i.e. a rule/group of rule is associated with a context). The context are used to keep statistics on that particular type of traffic. Based on that, different filters could be applied:

Traffic thresholds start triggering rate control of that particular traffic.

Traffic thresholds start triggering of lock down firewall.

Traffic shaping (limiting throughput of the matching traffic)

Once a firewall rule is activated locally, it becomes a candidate for moving its protection upstream automatically when condition permits.

6.4.8. Extension Support

This section is for support for 3rd party application to also install hooks into ip/firewall for—filtering and adding of disposition state.

6.4.9. Protocol Stack Integration

The firewall integrates with the protocol stack via the following 3 set of hooks (IP stack, L3 handlers, and L4 handlers)

IP Stack

Input inspection (before IP processing). This could be done before native header checking (FW will do more thorough checking), or after (for faster performance)

Before local delivery (for local traffic termination)

Before local forwarding (for routed traffic)

Before sending to L3 protocols (TCP/UDP/ICMP) handling

After IP processing

IP stack must provide hooks to

Manipulate the session TCP sequence number

Allow for termination

L3 protocol handler. This is optional for locally terminated traffic.

L4 protocol handler. This is optional for locally terminated traffic.

6.5. Propagation Protocol

SSL/TLS to establish trusted administrative domain. Trusted domain defines by a root level certificate.

Propagation of profile: create, delete, update

Activation/deactivation of profile from client

Firewall could be deactivated by servers. In which case, it is treated as if the profile activation was denied in the first place.

Ownership of profile: Source of profile and router running it.

Automatic peer discovery.

Firewall could only be installed from a host/router which own the source (egress firewall) or destination (ingress firewall).

6.5.1. Establish of Trusted Administrative Domain

This includes using certificates to authenticate peer, and advertisement of service/capabilities of each peer.

6.5.2. Peer/Network Discovery

This support (optional) allows for the discovery of peer without manual configuration. It uses algorithm similar to route tracing to discover router in the path, then attempt to negotiate certificate and service to discover if that router would support remote installation of firewall.

6.5.3. Installation of Firewall Profiles
TBD

6.5.4. Update/Delete of Firewall Profiles
TBD

6.5.5. Monitoring of Firewall Owners

Each firewall implement rules for a remote owner must continuously monitor the owner status. If the owner no longer update its status, the rule will be deactivated automatically (exception for DOS handling when the owner has difficulty maintain continuos control).

6.5.6. Startup (Client and Server Side)
TBD

6.6. NAT

This component could be derived from Mocana TCP/IP stack currently with some modification to make it standalone, and support for VOIP applications.

NAT supports is summarized as followed:
- As addresses (thus filtering pattern) are modified when traversing through NAT boundaries, firewall rule must also be subjected to the same modification scheme when moving through.
- The filter table translation could be done either on the local or remote host.
- The NAT translation table could be updated quickly, resulting in large remap discovery/notification traffic.
- Local rule could be minimized due to localization of controlled resource (i.e. servers are at a special addresses, privileged ports
  are at a special ranges, . . . )—resulting compact firewall rule. NAT tends to randomize that and renders grouping/ranging rules worthless (i.e. 1 internal address=>multiple external addresses, or 1 address range=>1 address with random ports)

Although illustrative embodiments and applications of this invention are shown and described herein, many variations and modifications are possible which remain within the concept, scope, and spirit of the invention, and these variations would become clear to those of ordinary skill in the art after perusal of this application. For example, firewall rule/policy propagation may also occur in the downstream direction whereby, for example, a firewall is moved closer to the source of an attack (e.g., a rouge component in the network). In another example, network address translation (NAT) data may have to be taken into consideration when transmitting data in policy statements and other firewall rule data across network boundaries, such as boundary 106. This may require altering a rule or policy, public and private addresses, new NAT entries based on traffic flow, and so on. Accordingly, the embodiments described are to be considered as illustrative and not restrictive, and the invention is not to be limited to the details given herein, but may be modified within the scope and equivalents of the appended claims.

We claim:

1. A method of filtering data entering a network, the method comprising:
    creating a first policy statement containing one or more trigger names, one or more propagation policies, and one or more trigger short definitions, wherein the first policy statement is created by pre-existing firewall software;
    within the network, propagating the first policy statement to a network data security server;
    determining if there is a match in a first trigger name contained in the first policy statement with a second trigger name contained in a second policy statement;
    if there is a match, creating a combined policy statement, wherein the second policy statement contains data that overrides data in the first policy statement;
    sending an application programming interface (API) to the pre-existing firewall software if there is a trigger; and
    determining which recipients should receive the combined policy statement.

2. A method as recited in claim 1 further comprising:
    detecting an event; and
    determining whether the event is the trigger.

3. A method as recited in claim 2 wherein determining whether the event is the trigger further includes checking to see if the event is listed in a policy propagation file.

4. A method as recited in claim 2 wherein determining whether the event is the trigger further comprises determining whether the event is a network-based trigger or an external trigger.

5. A method as recited in claim 1 wherein the network data security server is a firewall server.

6. A method as recited in claim 1 wherein creating a first policy statement includes storing trigger data in a policy statement when a trigger is activated.

7. A method as recited in claim 1 further comprising trigger long definitions and trigger long names.

8. A method as recited in claim 1 wherein creating the first policy statement further comprises storing trigger data in the first policy statement when a trigger is activated.

9. A method as recited in claim 1 further comprising translating the trigger definitions.

* * * * *